(12) United States Patent
Tan et al.

(10) Patent No.: US 12,099,840 B1
(45) Date of Patent: Sep. 24, 2024

(54) THROUGHPUT INCREASE FOR TENSOR OPERATIONS

(71) Applicant: Amazon Technologies, Inc., Seattle, WA (US)

(72) Inventors: Xiaodan Tan, Mountain View, CA (US); Paul Gilbert Meyer, Jericho, VT (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/185,236

(22) Filed: Mar. 16, 2023

(51) Int. Cl.
*G06F 9/30* (2018.01)

(52) U.S. Cl.
CPC ...... *G06F 9/30018* (2013.01); *G06F 9/30032* (2013.01)

(58) Field of Classification Search
None
See application file for complete search history.

(56) References Cited

U.S. PATENT DOCUMENTS

| | | | |
|---|---|---|---|
| 5,867,414 A | 2/1999 | Kao | |
| 7,250,896 B1 | 7/2007 | Hesener | |
| 11,269,632 B1 * | 3/2022 | AlBarakat | G06F 9/30025 |
| 2003/0014457 A1 | 1/2003 | Desai et al. | |
| 2021/0042260 A1 * | 2/2021 | Reinhardt | G06F 9/30036 |
| 2021/0117977 A1 * | 4/2021 | Kim | G06F 18/214 |
| 2021/0349718 A1 * | 11/2021 | Wang | G06F 9/544 |
| 2021/0398621 A1 | 12/2021 | Stojevic et al. | |
| 2021/0406018 A1 * | 12/2021 | Adelman | G06F 9/30036 |
| 2022/0405123 A1 * | 12/2022 | Bradbury | G06F 16/258 |
| 2022/0413851 A1 | 12/2022 | Gurram et al. | |
| 2022/0414182 A1 * | 12/2022 | Adelman | G06F 9/30036 |

OTHER PUBLICATIONS

U.S. Non-Final Office Action dated Mar. 28, 2024 in U.S. Appl. No. 17/937,332.
U.S. Appl. No. 17/937,332, inventors Meyer et al., filed on Sep. 30, 2022.

* cited by examiner

*Primary Examiner* — Eric Coleman
(74) *Attorney, Agent, or Firm* — Weaver Austin Villeneuve & Sampson LLP

(57) ABSTRACT

A technique for performing a tensor operation includes inputting concatenated data words of a first input tensor and concatenated data words of a second input tensor into a compute channel having a plurality of compute stages coupled in series. The concatenated data words of the first input tensor and the second input tensor represented in a first datatype can be converted into data elements represented in a second datatype using a first subset of the compute stages. A binary operation can be performed on each data element represented in the second datatype from the first input tensor with a corresponding data element represented in the second datatype from the second input tensor to generate output data elements of an output tensor represented in the second datatype using a second subset of the compute stages. The output data elements of the output tensor can then be outputted from the compute channel.

21 Claims, 8 Drawing Sheets

THROUGHPUT INCREASE FOR TENSOR OPERATIONS

BACKGROUND

Neural networks utilize computational models to perform complex tasks. A neural network can perform computations using a set of weights. Through these computations, the weights are combined with input data (which can also be referred to as feature maps) through multiple layers to perform an inference operation. For example, a neural network model can be used in natural language processing to translate and understand human language, or in computer vision systems to analyze and process images and video frames. The weights used in a specific neural network can be determined via a training process in which the weight values are tuned to yield better predictions.

BRIEF DESCRIPTION OF THE DRAWINGS

Various embodiments in accordance with the present disclosure will be described with reference to the drawings, in which.

DETAILED DESCRIPTION

Figure 1:
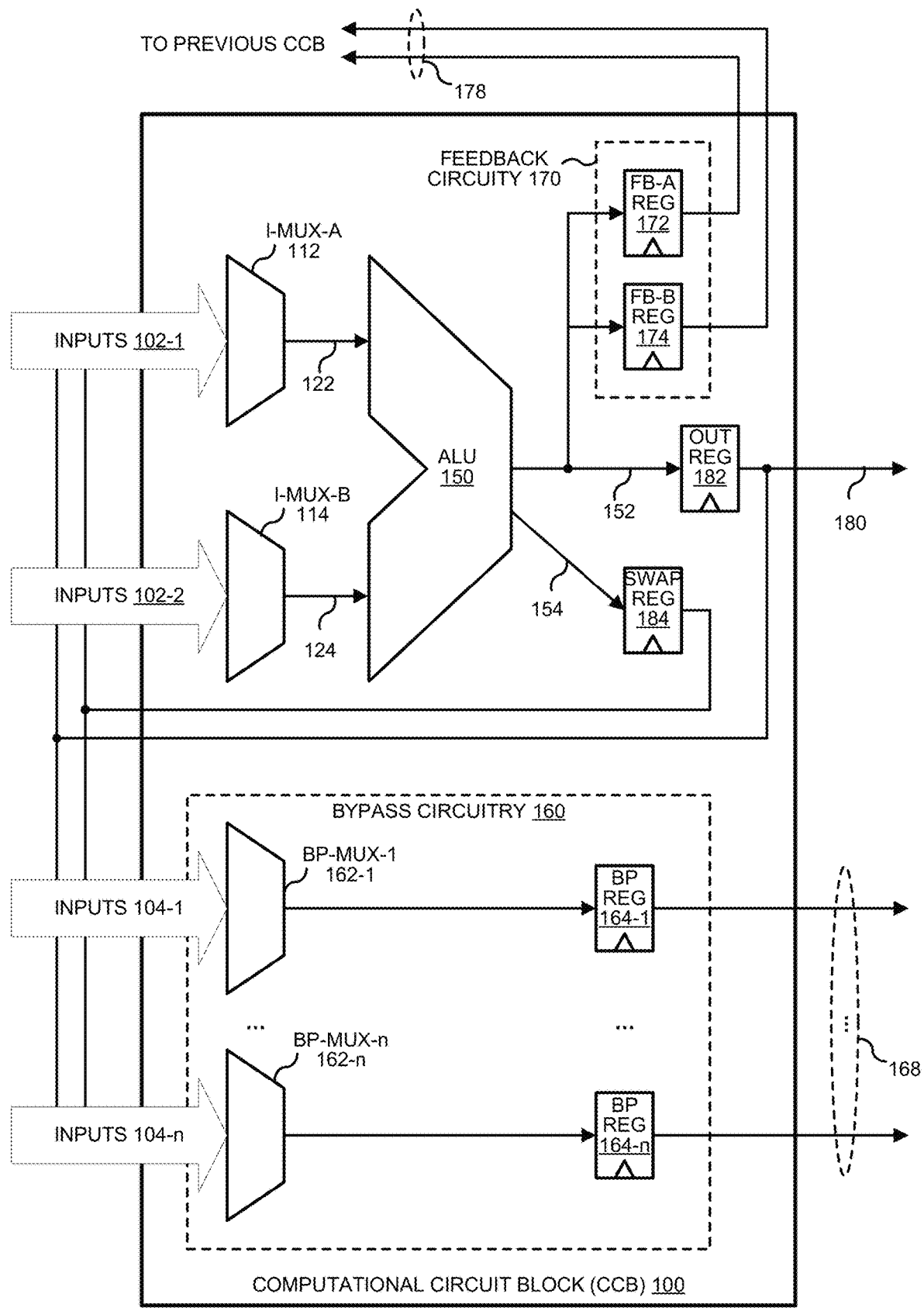
FIG. 1 illustrates a block diagram of an example of a computational circuit block.

Neural networks rely on tensor manipulations to perform training and inference operations. For example, a matrix multiplication operation can be performed to multiply an input feature map tensor with a weight tensor to generate an output feature map tensor. Other common tensor manipulations may include tensor-tensor operations in which corresponding elements from two input tensors are combined using a binary operation (e.g., addition, subtraction, etc.) to generate an output tensor. Although such tensor manipulations can be performed using general-purpose processors, specialized hardware such as accelerators can be implemented to perform the tensor manipulations more efficiently.

One type of circuitry that can perform tensor-tensor operations efficiently is a vector compute engine. A vector compute engine may include multiple compute channels, and each compute channel may include a set of compute stages coupled in series. The vector compute engine can be coupled to multiple memories to allow the vector compute engine to read and write to different memories. Each compute channel may include a read port coupled to each of the memories to read data from the respective memories, and a write port coupled to each of the memories to write data to the respective memories. Each compute stage may implement an arithmetic logic unit (ALU) that is designed to perform computations on a certain native datatype such as 32-bit floating-point (FP32) numbers, and each read/write port can support transferring 32 bits of data per clock cycle. To provide compatibility with other datatypes such as 16-bit floating-point (FP16) numbers or 16-bit Brain-float (BF16) numbers, each compute channel may include an input data converter coupled to each read port, and an output data converter coupled to each write port to perform datatype conversion.

For a tensor-tensor operation, each compute channel can be capable of outputting an output data element of the output tensor in each clock cycle. This throughput can be achieved when the two input tensors reside in different memories to allow the read ports to operate concurrently. For example, to perform a tensor-tensor operation on FP32 data elements of two tensors, a FP32 data element from each of the two tensors can be concurrently inputted into the compute channel in each clock cycle. However, when the two tensors reside in the same memory, only one read port is active, and respective data elements from the two tensors are read alternately from the same memory on the same read port. This will result in operating the compute channel at half the throughput by outputting one output data element at every other cycle. This reduction in throughput also happens when the input data elements are reduced-length datatypes such as 16-bit data elements. Even though the read port can support reading up to 32 bits of data per clock cycle, the input data converter to convert the 16-bit datatype to FP32 datatype can be limited to one input data element per cycle. Hence, the throughput of the compute channel may still be capped at half the bandwidth.

To improve the throughput of tensor-tensor operations when operating on reduced-length datatypes, the techniques disclosed herein operate the compute channel in a manner that can generate an output data element in each clock cycle to achieve full bandwidth even when the input tensors are sourced from the same memory. This can be achieved without making hardware modifications to the vector compute channel. Using such techniques, even though the two tensors may reside in the same memory, multiple input data elements from one tensor can be inputted into the compute channel at each clock cycle alternately with multiple input data elements from the other tensor. Instead of relying on the input data converter, the compute channel can perform the input datatype conversion using the internal ALUs of the compute channel. The compute channel also performs the binary operation to combine the data elements of the two input tensors. To have better accuracy in the output tensor, the output data converter can be used to perform output datatype conversion by rounding the output data elements. Such techniques allow the compute channel to generate an output data element in each clock cycle to achieve full throughput when performing tensor-tensor operations on input tensors sourced from the same memory.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a computational circuit block (CCB) 100 that can be implemented in a computational pipeline of an integrated circuit device. Computational circuit block 100 includes an arithmetic logic unit (ALU) circuit 150. ALU circuit 150 can be implemented to process floating-point numeric inputs of up to a certain bit length such as 32-bit floating point numbers (FP32). ALU circuit 150 can also be implemented to support numeric inputs of other datatypes. ALU circuit 150 includes a first numeric input 122 selected by an input multiplexor 112, a second numeric input 124 selected by an input multiplexor 114, and a primary result output 152. ALU circuit 150 can be programmed to perform various computational operations on first numeric input 122 and/or second numeric input 124 to generate primary result output 152.

For example, ALU circuit 150 can be programmed to generate primary result output 152 by selecting a computational operation from various available operations to perform on the numeric input(s). The computational operations may include one or more of a passthrough function (or identity function) of the first numeric input 122, bitwise inversion of the first numeric input 122, arithmetic left shift of the first numeric input 122 by a number of bits indicated by the second numeric input 124, arithmetic right shift of the first numeric input 122 by a number of bits indicated by the second numeric input 124, addition of the first numeric input 122 and the second numeric input 124, subtraction of the second numeric input 124 from the first numeric input 122, multiplication of the first numeric input 122 and the second numeric input 124, division of the first numeric input 122 by the second numeric input 124, select the maximum (MAX) of the first numeric input 122 and the second numeric input 124, select the minimum (MIN) of the first numeric input 122 and the second numeric input 154, bitwise AND of the first numeric input 122 and the second numeric input 124, bitwise OR of the first numeric input 122 and the second numeric input 122, bitwise XOR of the first numeric input 122 and the second numeric input 124, logical AND of the first numeric input 122 and the second numeric input 124, logical OR of the first numeric input 122 and the second numeric input 122, logical XOR of the first numeric input 122 and the second numeric input 124, logical left shift of the first numeric input 122 by a number of bits indicated by the second numeric input 124, logical right shift of the first numeric input 122 by a number of bits indicated by the second numeric input 124, etc. In some implementations, the computational operations may also include comparison functions such as whether the first numeric input 122 is equal to, not equal to, greater than, great than or equal to, less than or equal to, and/or less than the second numeric input 124, etc. Other supported computational operations may include an absolute difference between the first numeric input 122 and the second numeric input 124, selection of the first numeric input 122 or the second numeric input 124, and/or other functions to generate a value based on the first numeric input 122 and/or the second numeric input 124. ALU circuit 150 can also be programmed to apply the computational operation with the first numeric input 122 reversed with the second numeric input 124. Although various computational operations have been described, depending on the application and usage of ALU circuit 150, the computational logic within ALU circuit can be simplified to support fewer of the computational operations described above. In some implementations, ALU circuit 150 can also support other computational operations not specifically described.

ALU circuit 150 may include a secondary output 154 to loopback the first numeric input 122 or the second numeric input 124 to computational circuit block 100. This secondary output 154 can provide a swap out path for the ALU circuit 150 to retain a value that was inputted into the ALU circuit 150 (e.g., by storing the value in a swap register 184). This capability of ALU circuit 150 allows a computation pipeline composed of such ALU stages to provide native hardware support for ordering manipulations such as sorting a series of data elements, or finding and locating data elements of a vector being streamed into the pipeline. For example, when ALU circuit 150 is programmed to perform a maximum function, the larger of the first numeric input 122 and the second numeric input 124 can be outputted to the next ALU stage, and the other unselected numeric input can be outputted on the secondary output 154. Similarly, when ALU circuit 150 is programmed to perform a minimum function, the smaller of the first numeric input 122 and the second numeric input 124 can be outputted to the next ALU stage, and the other unselected numeric input can be outputted on the secondary output 154.

Computational circuit block 100 includes an output register 182 configured to receive the primary result output 152 of ALU circuit 150, and provide the primary result output 152 of ALU circuit 150 as the primary output 180 of computational circuit block 100 to the next CCB. By registering primary result output 152, pipeline stages of computational circuit blocks can be coupled in series to create a computational pipeline in which input values are operated on at each clock cycle by an ALU stage, and the result is provided to the next ALU stage for further processing in the next clock cycle. Computational circuit block 100 also includes a swap register 184 configured to receive the secondary output 154 of ALU circuit 150, and to feedback the secondary output 154 as one of the inputs to the computational circuit block 100 at the next clock cycle. As mentioned above, the swap register 184 can be used to store and retain a value being streamed into computational circuit block 100 to allow efficient sort, search, and/or locate functions to be performed.

Computational circuit block 100 may also include feedback circuitry 170 having one or more feedback registers that are each configured to receive the primary result output 152 of the ALU circuit 150, and provide the primary result output 152 of the ALU circuit 150 to a previous computational circuit block of the pipeline. In some implementations, the feedback circuitry 170 can include multiple feedback registers to enable computational circuit block 100 to maintain and store multiple running computational results on different sets of data elements being streamed into the pipeline. For instance, feedback circuitry 170 may include two feedback registers 172 and 174 that are each individually configured to receive the primary result output 152 of the ALU circuit 150 to feedback to the previous computational circuit block. Each of feedback registers 172 and 174 can have its own independent enable signals. During operation, computational circuit block 100 can be programmed to sequentially enable to the first feedback register 172 alternately with the second feedback register 174 at each clock cycle. Hence, the first feedback register 172 will be updated with the computational result of ALU circuit 150 every other clock cycle, and the second feedback register 172 will be updated with the computational result of ALU circuit 150 alternately in the clock cycles in between. This allows computational circuit block 100 to maintain a first computational result in feedback register 172 that are computed from odd sequenced data elements (e.g., first, third, fifth, etc. data elements being streamed into the pipeline), and a second computational result in feedback register 174 that are computed from even sequenced data elements (e.g., second, fourth, sixth, etc. data elements being streamed into the pipeline). For example, feedback register 172 can be used to maintain a running sum of the odd sequenced data elements of an input vector, and feedback register 174 can be used to maintain a running sum of the even sequenced data elements of the input vector. By controlling the independent enables of the feedback registers, running computational results of various data patterns can be achieved.

Computational circuit block 100 may also include bypass circuitry 160 having one or more bypass circuits each including a bypass multiplexor coupled to a bypass delay register. Each bypass circuit is operable to independently select one of the inputs of computational circuit block 100 to output to the next computational circuit block of the pipeline on bypass outputs 168. For example, bypass circuitry 160 may include bypass multiplexor 162-1 to select an input for bypass delay register 164-1, and bypass multiplexor 162-n to select an input for bypass delay register 164-n. In some implementations, computational circuit block 100 may include, for example, at least three bypass circuits, or other number of bypass circuits. When coupled in a pipeline, bypass circuitry 160 enables an input data element or an intermediate computational result to be provided to different ALU stages in the pipeline. Bypass circuitry 160 also provides the capability for the different ALU stages to receive independent inputs, and allows the different ALU stages in the pipeline to operate independently on different sets of inputs.

Computational circuit block 100 may include an input multiplexor for each of the numeric inputs of the ALU circuit 150, as well as a bypass multiplexor for each of the one or more bypass circuits. In the implementation shown in FIG. 1, computational circuit block 100 has input multiplexors 112 and 114, and bypass multiplexors 162-1 to 162-n. Each of these multiplexors may independently select an input from a set of inputs of the computational circuit block 100. For example, input multiplexor 112 may select an input from the set of inputs 102-1 to provide as the first numeric input 122 for ALU circuit 150; input multiplexor 114 may select an input from the set of inputs 102-2 to provide as the second numeric input 124 for ALU circuit 150; bypass multiplexor 162-1 may select an input from the set of inputs 104-1 to provide to bypass delay register 164-1; and bypass multiplexor 162-n may select an input from the set of inputs 104-n to provide to bypass delay register 164-n.

Each set of inputs 102-1, 102-2, 104-1, and 104-n may include one or more of the following inputs: a primary output of the previous computational circuit block of the pipeline (or an input to the pipeline if it is the first computational circuit block), any of the outputs of the bypass circuits of the previous computational circuit block (or one of the inputs to the pipeline if it is the first computational circuit block), the primary output 180 of the computational circuit block 100 itself, the output of the swap register 184, and/or any of the outputs of the feedback registers from the next computational circuit block. In some implementations, the set of inputs 104-1 to 104-n selectable by each of the bypass multiplexors can be the same set of inputs, and the set of inputs 102-1 and 102-2 selectable by each of the input multiplexors can be the same set of inputs. Furthermore, the set of inputs 104-1 to 104-n can be the same as the set of inputs 102-1 and 102-2. Having each of the multiplexors able to select from the full set of inputs available to the computational circuit block 100 provides flexibility to program the computational circuit block 100 to perform various types of computations. Nevertheless, in some implementations, any one or more of the sets of inputs 102-1, 102-2, and 104-1 to 104-n may contain one or more inputs that are not available in another set of inputs, or may lack one or more inputs that are included in another set of inputs.

It should be noted that although computational circuit block 100 has been shown in FIG. 1 to include various features such as bypass circuitry 160, feedback circuitry 170, and swap register 182, other implementations of the computational circuit block may omit one or more components shown in FIG. 1. For example, a computational circuit block may include just one feedback register, or just one bypass circuit, or may include bypass circuitry without feedback circuitry, etc. Furthermore, computational circuit block 100 may include additional components not specifically shown.

Figure 2:
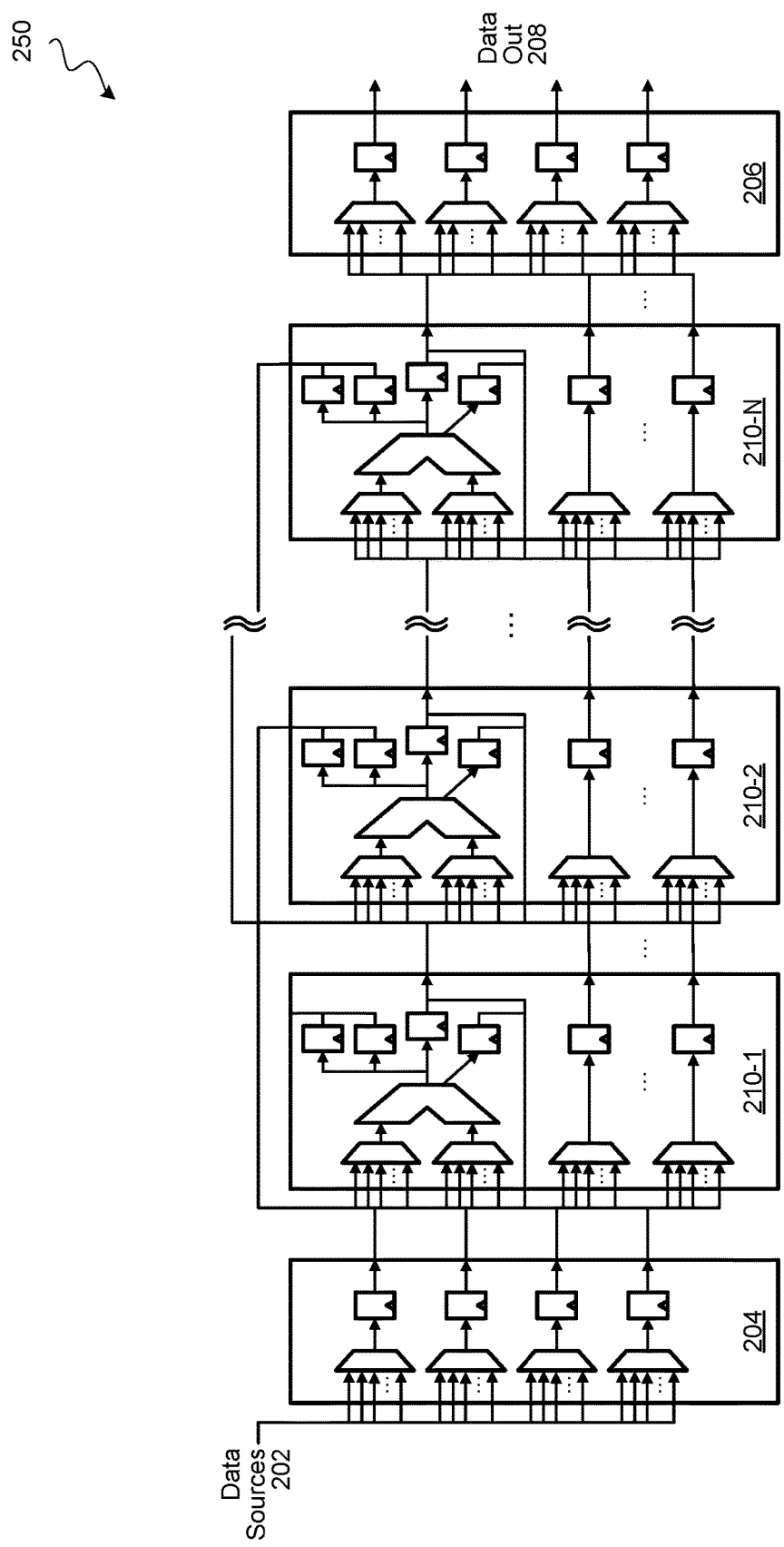
FIG. 2 illustrates a block diagram of an example of an integrated circuit implementing a compute channel.

FIG. 2 illustrates an example of an integrated circuit 250 implementing a compute channel formed by coupling multiple computational circuit blocks in series in a pipeline. Integrated circuit 250 can be part of a vector compute engine of a data processor (e.g., a data processing integrated circuit device such as a processor, a graphics processor, a digital signal processor, a tensor processor, a neural network accelerator, or other types of application specific integrated circuits). For example, a vector compute engine may include multiple compute channels that are each implemented with an instance of integrated circuit 250.

Integrated circuit 250 includes multiple computational circuit blocks 210-1 to 210-N coupled in series. The number of computational circuit blocks N can be at least four, at least eight, at least ten, at least sixteen, or other suitable number. Each computational circuit block in integrated circuit 250 can be implemented, for example, using computational circuit block 100. It should be noted that not each of the computational circuit blocks 210-1 to 210-N needs to be identical. For example, the first computational circuit blocks 210-1 does not have a previous computational circuit block to receive feedback outputs from the feedback circuitry. As such, the feedback circuitry can be omitted from the first computational circuit blocks 210-1. More generally, the components provided in each computational circuit block in the pipeline can be the same, or can vary depending on the application.

Each of computational circuit blocks 210-1 to 210-N includes an ALU circuit, and thus the pipeline in integrated circuit 250 can be considered as an ALU pipeline having multiple ALU stages coupled in series. Each ALU stage has a first numeric input, a second numeric input, and a primary result output. Each of the ALU stage is programmable to perform a computational operation on the first numeric input and/or the second numeric input of the ALU stage to generate the primary result output. The primary result output is provided to the next computational circuit block, which may select that primary result output as one of the numeric inputs to the ALU. For example, the primary result output of computational circuit block 210-1 is provided as an input to computational circuit block 210-2, and computational circuit block 210-2 may select the primary result output of computational circuit block 210-1 as one of the numeric inputs to the ALU stage of computational circuit block 210-2. Computational circuit block 210-2 can also select the primary result output of computational circuit block 210-1 to bypass the ALU stage and be outputted to the next computational circuit block 210-3 using the bypass circuitry.

Each of computational circuit blocks 210-1 to 210-N can be independently configured such that some or all of the ALU stages perform a different computational operation. Likewise, some or all of the ALU stages in the pipeline can be configured to perform the same computational operation. In some implementations, the multiplexors at the input interface of each computational circuit block can be independently configured to select any of the inputs that the computational circuit block receives. The bypass circuitry provided in each computational circuit block can also allow the computational circuit blocks in the pipeline to operate independently on different inputs.

For instance, a first set of inputs can flow into the first ALU stage of computational circuit block 210-1, and the result of the first ALU stage can flow into the second ALU stage of computational circuit block 210-2. The result of the second ALU stage of computational circuit block 210-2 can then be provided along a bypass path. For example, the bypass multiplexor of the next computational circuit block can select the primary output of computational circuit block 210-2, and provide the primary output of computational circuit block 210-2 along the bypass path down the pipeline to the subsequent computational circuit blocks. The primary output of computational circuit block 210-2 can be outputted by the bypass circuitry of the last computational circuit block 210-N.

Meanwhile, a second set of inputs can be provided along the bypass circuitry of computational circuit blocks 210-1 and 210-2. The input multiplexors for the ALU stage of the next computational circuit block can select this second set of inputs as the numeric inputs for the ALU. For example, the first input multiplexor and the second input multiplexor can select respective outputs of the bypass circuits of computational circuit block 210-2 to be used as the numeric inputs to the ALU circuit. The remaining ALU stages in the pipeline can operate on the result from this ALU circuit with the final result being outputted as the primary output of the last ALU stage of computational circuit block 210-N.

Hence, in this specific example, the first two ALU stages operate together on a first set of inputs, and the remaining ALU stages operate together on a second set of inputs. The bypass circuitry allows the two groups of ALU stages to operate independently from each other. In other scenarios, it's also possible to have two groups of ALU stages operate independently, and the results can be combined at a later ALU stage. These are just a few examples of the flexibility that the bypass circuitry provides on different ways that the pipeline can be configured and utilized.

In addition to the computational circuit blocks 210-1 to 210-N, integrated circuit 250 may also include an input interface circuit 204 and an output interface circuit 206. Input interface circuit 204 is operable to provide input data selectable from multiple data sources 202 to the pipeline of computational circuit blocks 210-1 to 210-N. Data sources 202 may include data being read from a memory (e.g., a buffer memory storing tensor data elements), as well as other data sources. In some implementations, the data being read from memory can be provided via a read port, and multiple read ports can be implemented for each memory coupled to integrated circuit 250. Each read port can also be coupled to a corresponding input data converter (not shown). The input data converter can convert data elements represented in a certain datatype to the native datatype of the ALU stages. For example, the ALU stages can be designed to operate natively on FP32 datatype, and the input data converter can convert, for example, 8-bit integers (INT8), 8-bit floating point numbers (FP8), 16-bit integers (INT16), BF16, FP16, or other datatypes read from memory into FP32 values.

Other examples of data sources 202 may include a parameter table storing preloaded values, a pseudo-random number generator such as a linear feedback shift register, and/or a counter (e.g., that counts the number of input data elements). The selectable data sources 202 may also include a programmable constant value, a zero value, a floating-point one value, an integer one value, a value representing positive infinity, and/or a value representing negative infinity, etc. In some implementations, the selectable data sources 202 may also include a power of two value (e.g., 8, 16, 24, etc.) which can be used for shifting or masking operations, and/or a bit mask value for masking one or more bytes (e.g., 0xff, 0xff00, 0xff0000 0xff000000, 0xffff, 0xffff0000, 0xffffff00, 0xffffffff, etc.). Each of the multiplexors in the input interface circuit 204 can independently select the same or different data source to provide to the first computational circuit block 210-1.

At the end of the ALU pipeline, the last computational circuit block 210-N can be coupled to an output interface circuit 206. The output interface circuit 206 is operable to select between a primary output of the last computational circuit block 210-N and respective outputs of the bypass circuits of the last computation circuit block 210-N to provide as any of data outputs 208 to write to memory. In some implementations, the data being outputted can be written out to memory via a write port, and multiple write ports can be implemented for each memory coupled to integrated circuit 250. Each write port can also be coupled to a corresponding output data converter (not shown). The output data converter can convert data elements outputted in the native datatype of the ALU stages to another datatype such as INT8, FP8, INT16, BF16, FP16, or other suitable datatypes. The output data converter can perform the datatype conversion by rounding each output data element using a rounding technique such as round-to-the-nearest-even or stochastic rounding.

Figure 3:
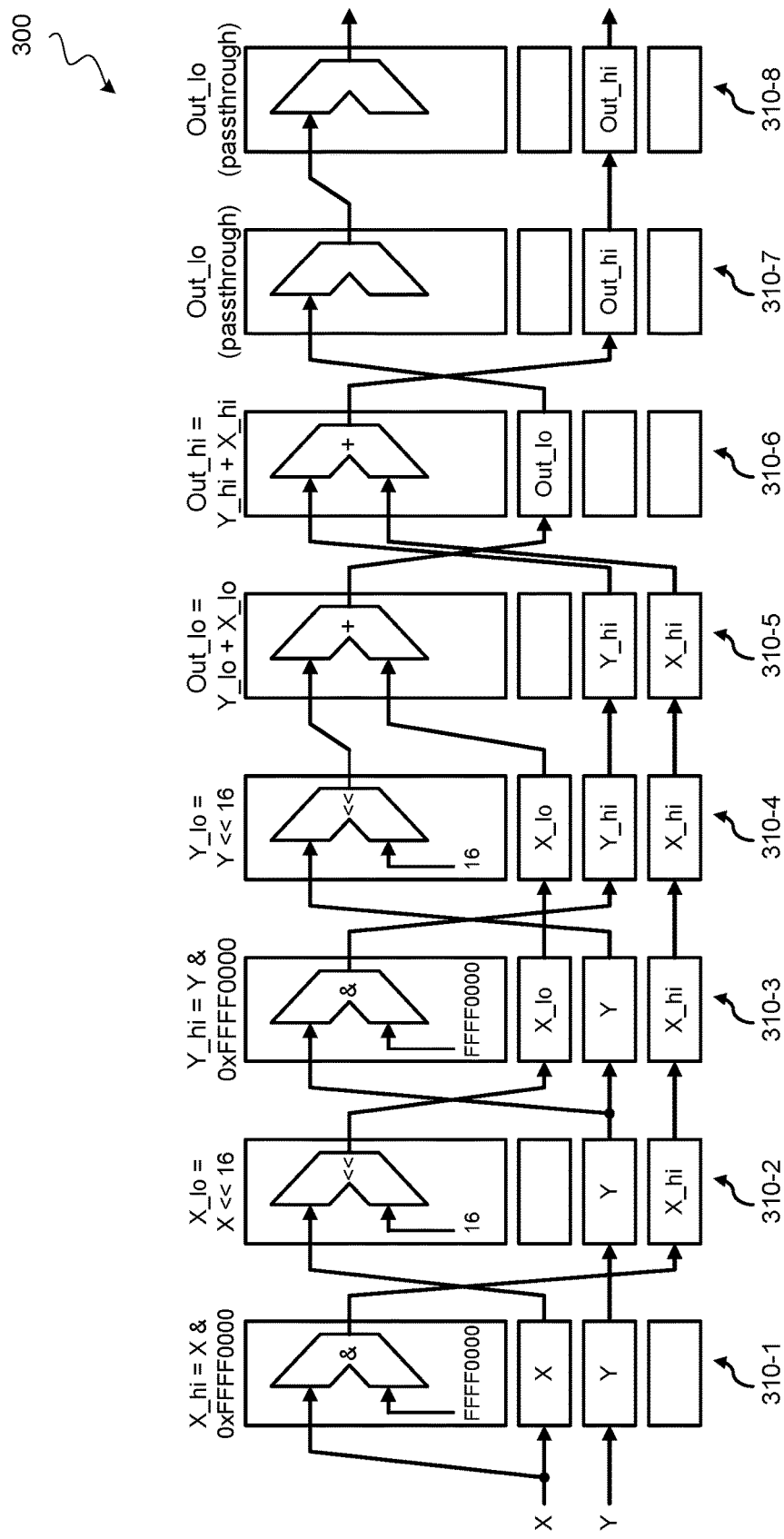
FIG. 3 illustrates a block diagram of an example of operating a compute channel.

FIG. 3 illustrates an example of operating a compute channel 300 to achieve one output data element per cycle throughput when performing a tensor-tensor operation on tensors being inputted into the compute channel on the same read port. Compute channel 300 can be implemented, for example, using integrated circuit 250. In the example shown in FIG. 3, compute channel 300 includes eight compute stages 310-1 to 310-8, and each compute stage includes an ALU and bypass circuitry. The bypass circuitry in each compute stage includes three bypass paths (e.g., three parallel bypass delay registers). Each compute stage can be implemented, for example, using computational circuit block 100. The input and output interface circuits of compute channel 300 and some of the internal circuitry of each compute stage have been omitted for ease of illustration. In other implementations, computer channel 300 may include a different number of compute stages, and/or a different number of bypass paths.

By way of example, the tensor-tensor operation shown in FIG. 3 performs an element-wise addition on two input tensors. In other words, each element of a first input tensor is added to a corresponding element of a second input tensor to generate a corresponding element of an output tensor. Although this example uses addition as the binary operation of the tensor-tensor operation, other binary operations can be used. In some implementations, pre-processing computations on either or both of the binary operation operands, and/or post-processing computations on the results of the binary operation can also be performed in compute channel 300.

The two input tensors for the tensor-tensor operation can be stored in the same memory (e.g., a state buffer memory), and thus the same read port may be used to read both input tensors into compute channel 300. The two input tensors can have data elements in a reduced-length datatype as compared to the native datatype of the ALUs in the compute channel 300. By way of example, the input data elements can be a BF16 datatype, and the native datatype of the ALUs can be FP32. Although the example of the tensor-tensor operation is described in the context of these datatypes, the techniques disclosed herein can be extended to other datatypes. More generally, the techniques disclosed herein can be applied to reduced-length datatypes that have the same number of exponent bits and fewer number of mantissa bits as the native datatype of the compute channel. The techniques can also be applied to other datatypes that can be converted to the native datatype of the ALUs by applying shifting (e.g., shift-right, shift-left) and/or masking (e.g., masking in, masking out) operations.

Given that the read port can support up to reading 32 bits of data per clock cycle, two BF16 data elements can be read from memory and provided to compute channel 300 in each clock cycle. The read port can alternate between reading two BF16 data elements of the first input tensor, and reading two BF16 data elements of the second input tensor from cycle to cycle. FIG. 3 illustrates the processing of two pairs of BF16 data elements in compute channel 300. The pair of BF16 data elements from the first input tensor is denoted as X, and the pair of BF16 data elements of the second input tensor is denoted as Y. In other words, input X contains two BF16 data elements from the first input tensor, and input Y contains two BF16 data elements from the second input tensor. Each pair of data elements can be referred to as a concatenated data word.

Concatenated data words X and Y are available to the first compute stage 310-1 after two clock cycles to allow the read port to read concatenated data word X from memory in the first clock cycle, and to read concatenated data word Y from memory in the second clock cycle. Concatenated data word X can be provided to the first bypass path of compute stage 310-1, and concatenated data word Y can be provided to the second bypass path of compute stage 310-1. The ALU of the first compute stage 310-1 can be configured to take the concatenated data word X from the first bypass path and a constant 0xFFFF0000 as operands, and apply a bitwise AND operation (denoted as "&") on these two operands. Given that BF16 can be converted to FP32 by appending 16 zeros to the mantissa, the effect of the bitwise AND operation is to mask out the lower bytes of the concatenated data word X such that the first BF16 data element in the upper bytes of the concatenated data word X is retained with 16 bits of trailing zeros to convert the first data element of the first tensor into the FP32 datatype. The result of the AND operation outputted by the first compute stage 310-1 is denoted as X_hi, and represents the first data element of the first tensor. The X_hi data element can be provided to the third bypass path of the second compute stage 310-2.

The ALU of the second compute stage 310-2 can be configured to take the concatenated data word X outputted from the first bypass path of the first compute stage 310-1 and a constant 16 as operands, and apply a left-shift operation (denoted as "<<") on the concatenated data word X by 16 bits. The effect of the shift operation is to retain the second BF16 data element in the lower bytes of the concatenated data word X and append 16 bits of trailing zeros to convert the second data element of the first tensor into the FP32 datatype. The result of the shift operation outputted by the second compute stage 310-2 is denoted as X_lo, and represents the second data element of the first tensor. The X_lo data element can be provided to the first bypass path of the third compute stage 310-3.

The ALU of the third compute stage 310-3 can be configured to take the concatenated data word Y outputted from the second bypass path of the second compute stage 310-2 and a constant 0xFFFF0000 as operands, and apply a bitwise AND operation (denoted as "&") on these two operands. The effect of the bitwise AND operation is to mask out the lower bytes of the concatenated data word Y such that the first BF16 data element in the upper bytes of the concatenated data word Y is retained with 16 bits of trailing zeros to convert the first data element of the second tensor into the FP32 datatype. The result of the AND operation outputted by the third compute stage 310-3 is denoted as Y_hi, and represents the first data element of the second tensor. The Y_hi data element can be provided to the second bypass path of the fourth compute stage 310-4.

The ALU of the fourth compute stage 310-4 can be configured to take the concatenated data word Y outputted from the second bypass path of the third compute stage 310-3 and a constant 16 as operands, and apply a left-shift operation (denoted as "<<") on the concatenated data word Y by 16 bits. The effect of the shift operation is to retain the second BF16 data element in the lower bytes of the concatenated data word Y and append 16 bits of trailing zeros to convert the second data element of the second tensor into the FP32 datatype. The result of the shift operation outputted by the fourth compute stage 310-4 is denoted as Y_lo, and represents the second data element of the second tensor. The Y_lo data element can be provided to the input of the ALU of the fifth compute stage 310-5.

At this point, the two BF16 data elements from the first tensor provided in the concatenated data word X has been converted to a X_hi FP32 data element and a X_lo FP32 data element, and two BF16 data elements from the second tensor provided in the concatenated data word has been converted to a Y_hi FP32 data element and a Y_lo FP32 data element. The binary operation of the tensor-tensor operation can now be applied to the pair of X_hi and Y_hi data elements and the pair of X_lo and Y_lo data elements.

The ALU of the fifth compute stage 310-5 can be configured to take the Y_lo data element outputted from the ALU of the fourth compute stage 310-4 and the X_lo data element from the first bypass path of the fourth compute stage 310-4, and apply the binary operation of the tensor-tensor operation to these two operands to generate an output data element Out_lo of the output tensor. In the example shown, the binary operation is the addition operation (denoted as "+"), and thus the output data element Out_lo is the result of adding X_lo and Y_lo. The output data element Out_lo can be provided to the first bypass path of the sixth compute stage 310-6.

The ALU of the sixth compute stage 310-6 can be configured to take the Y_hi data element outputted from the second bypass path of the fifth compute stage 310-5 and the X_hi data element from the third bypass path of the fifth compute stage 310-5, and apply the binary operation of the tensor-tensor operation to these two operands to generate an output data element Out_hi of the output tensor. In the example shown, the binary operation is the addition operation (denoted as "+"), and thus the output data element Out_hi is the result of adding X_hi and Y_hi. The output data element Out_hi can be provided to the second bypass path of the seventh compute stage 310-7.

The ALUs of the seventh and eight compute stages 310-7 and 310-8 can be configured to passthrough the output data element Out_lo along the ALU path, and propagate the output data element Out_hi along the bypass path. The two output data elements Out_hi and Out_lo in the FP32 datatype are thus provided to the output interface circuit of compute channel 300. Before writing the output data elements Out_hi and Out_lo to memory, the output data elements may need to be converted back to the original datatype of the input tensors. One way to convert FP32 datatype back to BF16 datatype is to simply truncate the 16 least significant bits of the FP32 data. However, depending on the input data elements and the binary operation being performed, the lower 16 bits of the output data elements Out_hi and Out_lo may include non-zero values. Simply truncating the 16 least significant bits may result in some loss in accuracy.

Another way to convert FP32 datatype back to BF16 datatype is to utilize the output data converter coupled to the write port of the output interface circuit. The output data converter can be configured to perform round-to-the-nearest-even, stochastic rounding, or other suitable rounding techniques when converting from a higher precision datatype to a lower precision datatype. Hence, a higher accuracy in the output tensor can be achieved by utilizing the output data converter of compute channel 300.

Although the output data converter may have a throughput of one output data element per clock cycle, this is sufficient for the tensor-tensor operation. Recall that it takes two clock cycles to read in two input data elements from the first input tensor and two input data elements from the second tensor. The tensor-tensor operation generates two output data elements from the four input data elements. Hence, the two output data elements can be outputted one after the other in two clock cycles, and still maintain full throughput. As such, the output data element Out_lo can be converted by the output data converter and written to memory in one clock cycle and the output data element Out_hi can be converted by the output data converter and written to memory in the next clock cycle. Compute channel 300 can toggle between inputting a concatenated data word of the first input tensor, and inputting a concatenated data word of the second input tensor into the compute channel at each clock cycle. After an initial latency to process the initial data elements in the pipeline of compute channel 300, an output data element can be outputted from compute channel 300 at each clock cycle to achieve the throughput of one output data element per cycle.

It should be noted that FIG. 3 is showing one example of operating compute channel 300 to achieve full throughput when performing a tensor-tensor operation. In other implementations, the ordering of certain operations such as which concatenated data word is converted into individual data elements, and which pair of data elements is combined by the binary operation can be varied. Furthermore, the data element being bypassed at each compute stage can be provided along a different bypass path. It should also be noted that two of the eight compute stages in compute channel 300 are configured in passthrough. In some implementations, the extra compute stages can be used to perform pre-processing of the operands to the binary operation, and/or perform post-processing of the result of the binary operation. For example, the extra compute stages can be used to perform scaling (e.g., multiply by a constant) of the output data elements. In implementations that have additional compute stages, more complex computations can be performed as part of the tensor-tensor operation.

Figure 4:
FIG. 4 illustrates a timing diagram of an example of operating a compute channel.

FIG. 4 illustrates a timing diagram 400 of an example of cycle-by-cycle processing performed by a compute channel (e.g., compute channel 300) for a tensor-tensor operation. Each column corresponds to a clock cycle, and the operations performed by each component of the compute channel (e.g., input interface, compute/ALU stages, and the output interface) are indicated in the row corresponding to the component. The two input tensors of the tensor-tensor operation are denoted as In0 and In1, and the data elements of the two input tensors are represented as the bracketed indices. The output tensor of the tensor-tensor operation is denoted as Out, and the data elements of the output tensor are represented as the bracketed indices.

In clock cycle 1, the input interface reads in the concatenated data word In0[0,1] of the first input tensor. The concatenated data word In0[0,1] includes the first two data elements of the first input tensor In0. In clock cycle 2, the input interface reads in the concatenated data word In1[0,1] of the second input tensor. The concatenated data word In1[0,1] includes the first two data elements of the second input tensor In0. At clock cycle 3, the pipeline of compute stages can begin processing the two concatenated data words In0[0,1] and In1[0,1]. The processing of this pair of concatenated data words through the pipeline of compute stages will now be described.

In clock cycle 3, the first compute stage (ALU1) performs a masking operation (denoted as "&") on concatenated data word In0[0,1] to convert data element In0[0] into the native datatype of the ALU. In clock cycle 4, the second compute stage (ALU2) performs a shifting operation (denoted as "<<") on concatenated data word In0[0,1] to convert data element In0[1] into the native datatype of the ALU. In clock cycle 5, the third compute stage (ALU3) performs a masking operation (denoted as "&") on concatenated data word In1[0,1] to convert data element In1[0] into the native datatype of the ALU. In clock cycle 6, the fourth compute stage (ALU4) performs a shifting operation (denoted as "<<") on concatenated data word In1[0,1] to convert data element In1[1] into the native datatype of the ALU. At this point, the four data elements In0[0]. In0[1], In1[0], and In1[1] have been converted into the native datatype.

In clock cycle 7, the fifth compute stage (ALU5) performs the binary operation on In0[0] and In1[0] (denoted as "op[0]") to generate the output data element Out[0]. In clock cycle 8, the sixth compute stage (ALU6) performs the binary operation on In0[1] and In1[1] (denoted as "op[1]") to generate the output data element Out[1]. In clock cycle 9, the seventh compute stage (ALU7) passes through output data elements Out[0] and Out[1]. In clock cycle 10, the eighth compute stage (ALU8) passes through output data element Out[0] and retains output data element Out[1]. In clock cycle 11, the output interface converts the output data element Out[0] back to the input datatype, and writes output data element Out[0] to memory. Meanwhile, ALU8 passes through output data element Out[1]. In clock cycle 12, the output interface converts the output data element Out[1] back to the input datatype, and writes output data element Out[1] to memory.

Returning back to clock cycle 3, while the compute stages begin processing of the two concatenated data words In0[0, 1] and In1[0,1], the input interface reads in the concatenated data word In0[2,3] of the first input tensor. The concatenated data word In0[2,3] includes the next two data elements of the first input tensor In0. In clock cycle 4, the input interface reads in the concatenated data word In1[2,3] of the second input tensor. The concatenated data word In1[2,3] includes the first two data elements of the second input tensor In1. At clock cycle 4, ALU1 can be idle because ALU1 has not yet received the concatenated data word In1[2.3]. Because it takes two cycles to input two concatenated data words into the pipeline of the compute stages, the ALUs can be idle every other clock cycle. At clock cycle 5, the pipeline of compute stages starting with ALU1 can begin processing the two concatenated data words In0[2,3] and In1[2,3]. Processing of the two concatenated data words In0[2,3] and In1[2,3]

through the pipeline is similar to In0[0,1] and In1[0,1], and this a description of which need not be repeated.

As illustrated in timing diagram 400, the input interface can continuously toggle between inputting a concatenated data word from the first input tensor and the second input tensor in each clock cycle, and the output interface can continuously output an output data element in each clock cycle to achieve full throughput. The ALUs can toggle between idle and a configured operation from cycle to cycle.

In some implementations, the compute channel can be programmed to perform the tensor-tensor operation using three micro-ops. Referring back to FIG. 3, the first micro-op may preload constants used in the pipeline for the masking and shifting operations (e.g., 0xFFFF0000 in first and third ALU stages, 16 in second and fourth ALU stages), read in a concatenated data word from the first input tensor, and branch to the second micro-op. The second micro-op may read in a concatenated data word from the second input tensor, configure the ALU stages to perform the masking, shifting, and binary operations as described above, and branch to the third micro-op. The third micro-op may read in a concatenated data word from the first input tensor, configure the ALU stages to be idle except for the last ALU stage to output an output data element, and branch back to the second micro-op. The compute channel can toggle between the second and third micro-op until processing of the input tensors is complete.

Figure 5:
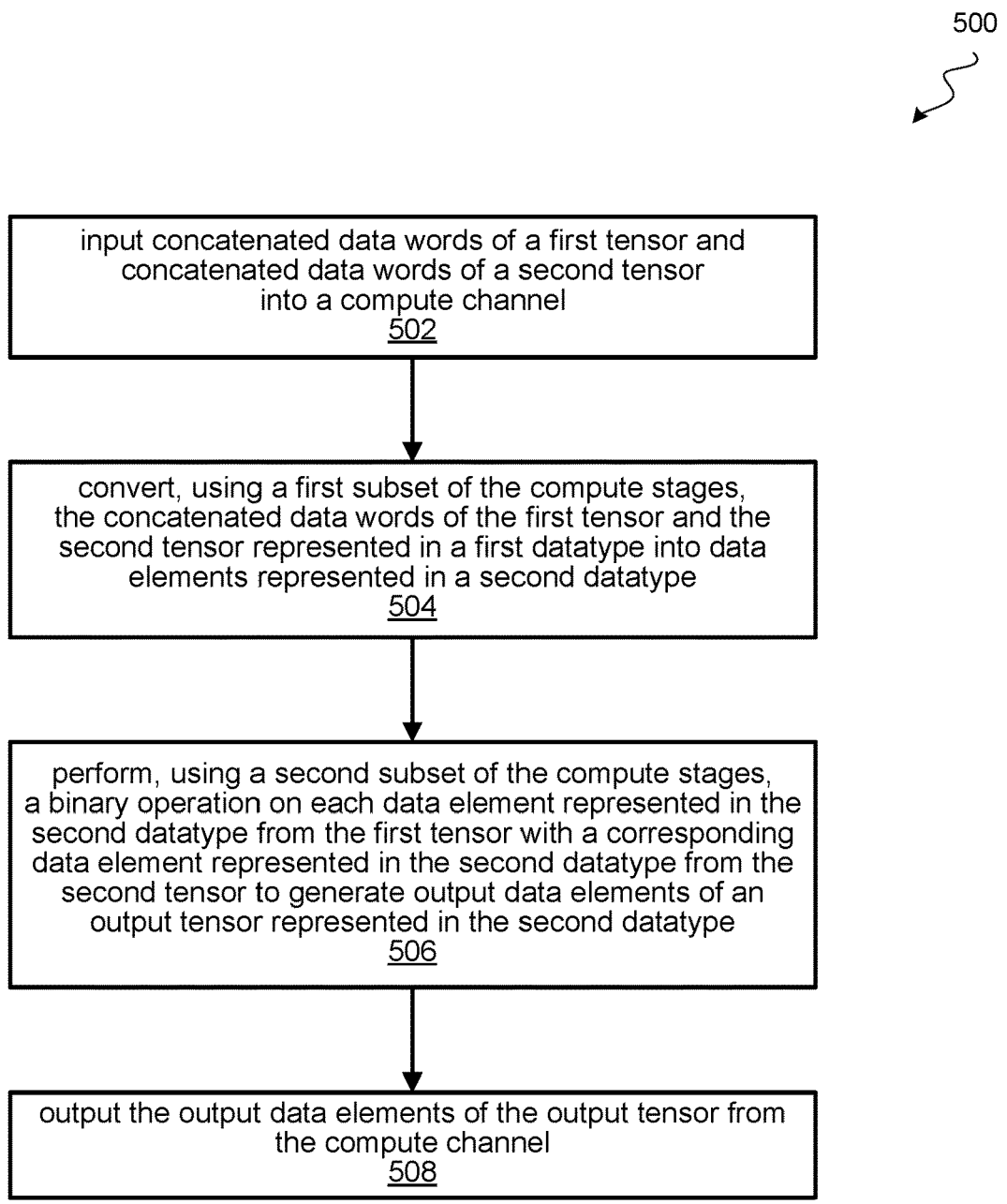
FIG. 5 illustrates a flow diagram of an example of operating a compute channel.

FIG. 5 illustrates a flow diagram of an example of a process 500 for performing a tensor computation. The tensor computation can be a tensor-tensor operation that performs an elementwise binary operation on two input tensors. Process 500 can be performed, for example, by an integrated circuit device having multiple compute stages coupled in series in a pipeline to form a compute channel. For example, the integrated circuit device may include eight compute stages, and can be implemented using compute channel 100 or integrated circuit 250. The compute channel may also include an input datatype converter and an output datatype converter. In some implementations, the integrated circuit device can be a compute engine implemented in an accelerator or other type of data processor. In some implementations, process 500 can be implemented as code (e.g., instructions or micro-ops) stored in a non-transitory computer-readable medium, which when executed by an integrated circuit device, causes the integrated circuit device to perform the operations of process 500.

Process 500 may begin at block 502 by inputting concatenated data words of a first input tensor and concatenated data words of a second input tensor into the compute channel. Each concatenated data word may include multiple data elements in a first datatype. The first input tensor and the second input tensor can be inputted from the same memory, and may be inputted into the compute channel on the same read port. Hence, inputting the concatenated data words may include toggling between inputting a concatenated data word of the first input tensor in one clock cycle, and inputting a concatenated data word of the second input tensor into the compute channel in the next clock cycle if both input tensors share the same read port.

At block 504, a first subset of the compute stages can convert the concatenated data words of the first input tensor and the concatenated data words of the second input tensor represented in a first datatype into data elements represented in a second datatype. The first datatype can be a reduced-length datatype as compared to the second datatype. For example, the first datatype can be BF16, and the second datatype can be FP32. Since the compute stages are used to perform the datatype conversion, the input datatype converter of the compute channel can be disabled or bypassed when the concatenated data words of the first tensor and the concatenated data words of the second tensor are provided to the compute stages of the compute channel.

By way of example, the compute channel may include a compute stage that masks out a portion (e.g., lower bytes) of the concatenated data word of the first input tensor to obtain a first data element of the first input tensor in the second datatype, and a compute stage that shifts the concatenated data word of the first input tensor to obtain a second data element of the first input tensor in the second datatype. The compute channel may also include a compute stage that masks out a portion (e.g., lower bytes) of the concatenated data word of the second input tensor to obtain a first data element of the second input tensor in the second datatype, and a compute stage that shifts the concatenated data word of the second input tensor to obtain a second data element of the second input tensor in the second datatype.

At block 506, a second subset of the compute stages can perform a binary operation on each data element represented in the second datatype from the first input tensor with a corresponding data element represented in the second datatype from the second input tensor to generate output data elements of an output tensor represented in the second datatype. By way of example, the compute channel may include a compute stage that performs the binary operation on the first data element of the first input tensor with the first data element of the second input tensor to obtain a first output data element of the output tensor, and a compute stage that performs the binary operation on the second data element of the first input tensor with the second data element of the second input tensor to obtain a second output data element of the output tensor.

At block 508, the output data elements of the output tensor can be outputted from the compute channel and be written to memory. The output data elements of the output tensor can be outputted from the compute channel at a throughput of one output data element per clock cycle. In some implementations, the output data elements can be outputted from the compute channel in the second datatype. In other implementations, each of the output data elements can be converted from the second datatype back to the first datatype prior to being outputted from the compute channel. Conversion of the output data elements from the second datatype to the first datatype can be performed by the output datatype converter. The output datatype converter may perform the datatype conversion using rounding techniques such as round-to-the-nearest-even, stochastic rounding, or other suitable rounding techniques to improve the accuracy of the output tensor. The output data elements can also be converted from the second datatype to a different datatype (e.g., a third datatype) by the output datatype converter.

Although certain aspects of the disclosure have been described in the context of neural networks and neural network accelerators, the techniques disclose herein can also be used in other applications and/or other integrated circuit devices. For example, the techniques disclosed herein can be used in digital signal processors, graphics processing units, or other data processors to perform vector computations.

Figure 6:
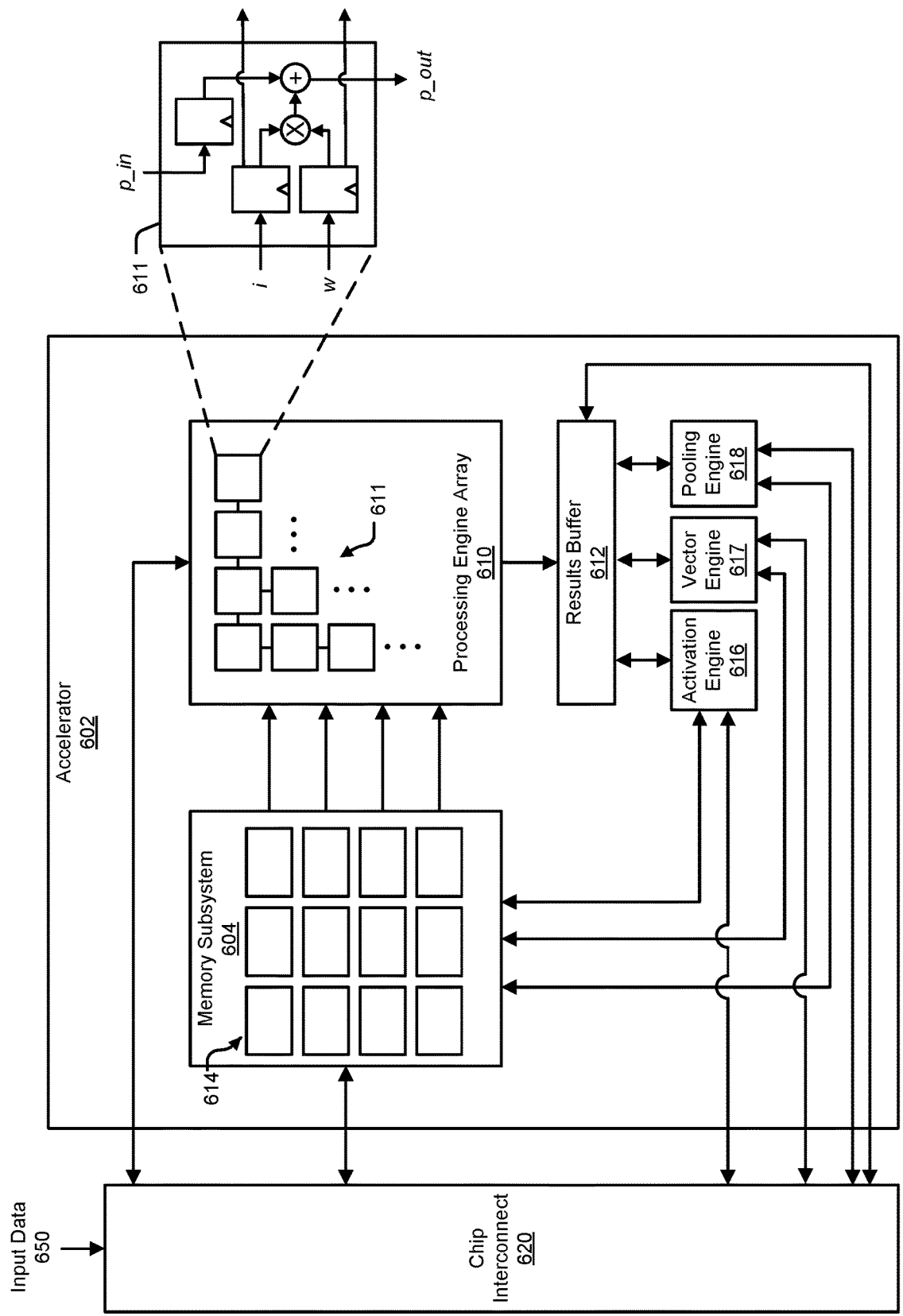
FIG. 6 illustrates a block diagram of an example of an integrated circuit device.

FIG. 6 is a block diagram illustrating an example of an integrated circuit device that can include an accelerator 602. In various examples, the accelerator 602, for a set of input data (e.g., input data 650), can execute computations using a processing engine array 610, an activation engine 616, a vector engine 617, and/or a pooling engine 618. In some examples, the example accelerator 602 may be an integrated circuit component of a processor, such as a neural network processor. The processor may have other integrated circuit components, including additional accelerator engines.

In various implementations, the memory subsystem 604 can include multiple memory banks 614. Memory subsystem 604 can also be referred to as a state buffer. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the vector engine 617, the pooling engine 618, and any external clients that access the memory subsystem 604 over a communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616, the vector engine 617, and the pooling engine 618 can include multiple execution channels, each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611, arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 610 can have, for example, 64 columns and 128 rows, or some other number of columns and/or rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum, p_in, provided either from another processing engine 611 or from a previous round of computation by the processing engine array 610. When starting a computation for a new set of input data, the top row of the processing engine array 610 can receive a fixed value for p_in, such as zero. As illustrated by this example, i and w are multiplied together and the result is summed with p_in to produce a new partial sum, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

In some implementations, the accelerator 602 can further include a vector engine 617 (may also be referred to as a vector compute engine). Vector engine 617 is a compute engine that can perform computations and manipulations on values stored in memory subsystem 604 and/or results buffer 612 such as values representing matrices of input values, weight values, intermediate results, etc. Vector engine 617 can include multiple execution channels (e.g., compute channels) each with a pipeline of computation circuit blocks (e.g., arithmetic logic units) to perform complex computations such as nested multiply-and-add operations and/or complex manipulations such as sorting operations. In various examples, execution channels of the vector engine 617 can operate in parallel and/or simultaneously. Vector engine 617 can be implemented, for example, using multiple instances of compute channel 250 or 300. In some examples, the vector engine 617 can be bypassed or be omitted.

Herein, the activation engine 616, the vector engine 617, and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616, the vector engine 617, and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
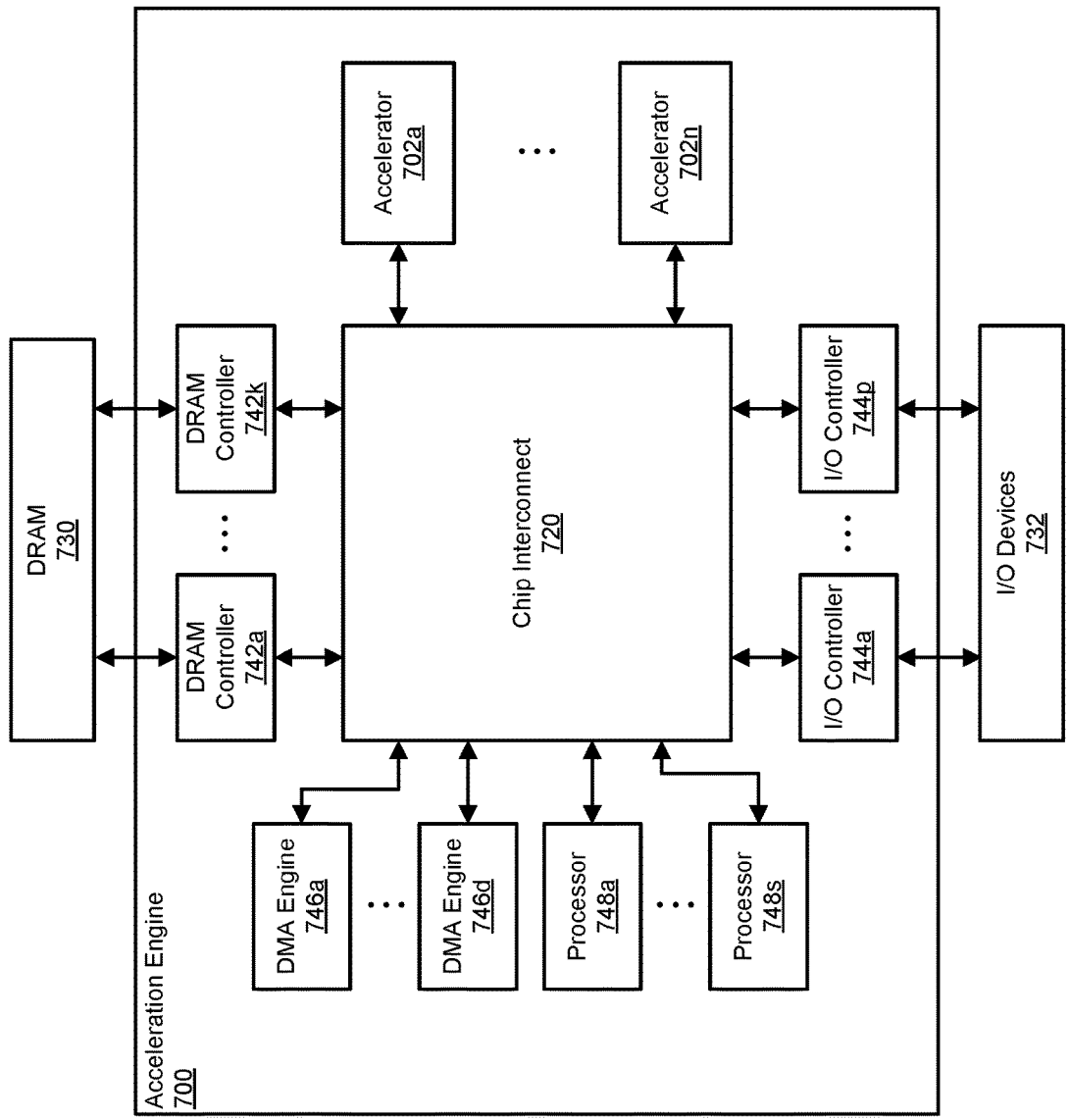
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general-purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueueing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
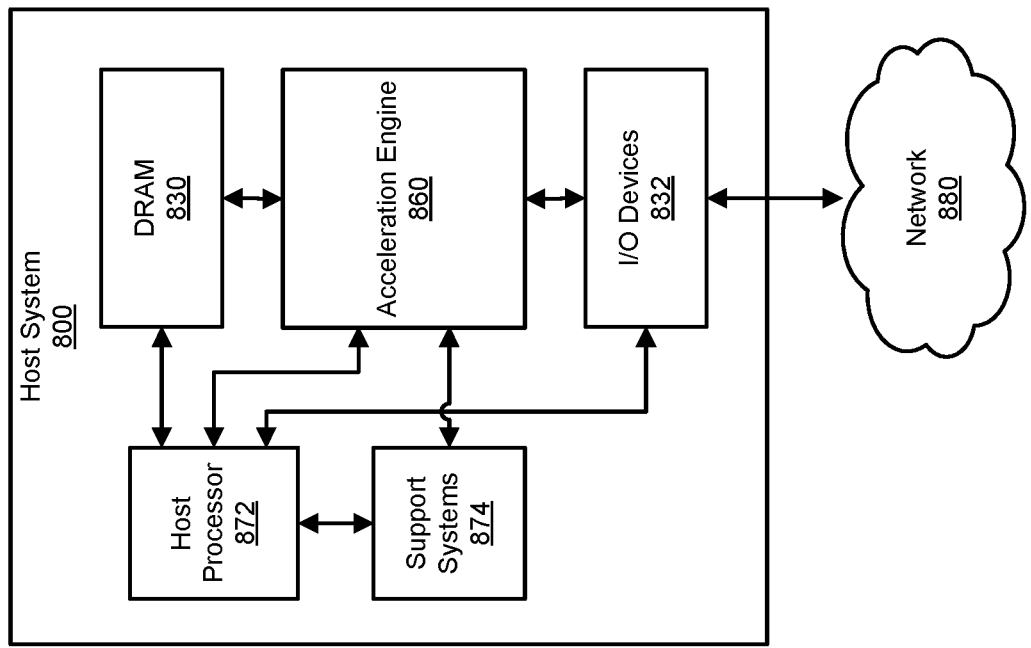
FIG. 8 illustrates a block diagram of an example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general-purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software programs, program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A compute channel for performing a tensor computation, the compute channel comprising:
    an input interface having an input datatype converter;
    a plurality of compute stages coupled in series in a pipeline; and
    an output interface having an output datatype converter,
    wherein the input interface is configured to toggle between inputting a concatenated data word from a first input tensor and inputting a concatenated data word from a second input tensor, wherein each concatenated data word includes multiple data elements 8 represented in a first datatype,
    wherein the plurality of compute stages includes:
        a first compute stage configured to mask out lower bytes of the concatenated data word of the first input tensor to obtain a first data element of the first input tensor in a second datatype;
        a second compute stage configured to shift the concatenated data word of the first input tensor to obtain a second data element of the first input tensor in the second datatype;

a third compute stage configured to mask out lower bytes of the concatenated data word of the second input tensor to obtain a first data element of the second input tensor in the second datatype;

a fourth compute stage configured to shift the concatenated data word of the second input tensor to obtain a second data element of the second input tensor in the second datatype;

a fifth compute stage configured to perform a binary operation of the tensor computation on the first data element of the first input tensor with the first data element of the second input tensor to generate a first output data element of an output tensor represented in the second datatype; and a sixth compute stage configured to perform the binary operation of the tensor computation on the second data element of the first input tensor with the second data element of the second input tensor to generate a second output data element of the output tensor represented in the second datatype, and wherein the output interface is configured to convert output data elements of the output tensor from the second datatype to the first datatype, and output the data elements of the output tensor represented in the first datatype at a throughput of one output data element per clock cycle.

2. The compute channel of claim 1, wherein each of the first to sixth compute stages is configured to be idle at every other clock cycle during the tensor computation.

3. The compute channel of claim 1, wherein the input data converter is disabled during the tensor computation.

4. The compute channel of claim 1, wherein the first datatype is a 16-bit brain float (BF16) datatype, and the second datatype is a 32-bit floating-point (FP32) datatype.

5. A computer-implemented method comprising:
inputting concatenated data words of a first input tensor and concatenated data words of a second input tensor into a compute channel having a plurality of compute stages coupled in series, wherein each concatenated data word includes multiple data elements;
converting, using a first subset of the compute stages, the concatenated data words of the first input tensor and the concatenated data words of the second input tensor represented in a first datatype into data elements represented in a second datatype;
performing, using a second subset of the compute stages, a binary operation on each data element represented in the second datatype from the first input tensor with a corresponding data element represented in the second datatype from the second input tensor to generate output data elements of an output tensor represented in the second datatype; and
outputting the output data elements of the output tensor from the compute channel.

6. The computer-implemented method of claim 5, wherein inputting the concatenated data words of the first input tensor and the concatenated data words of the second input tensor into the compute channel includes toggling between inputting a concatenated data word of the first input tensor in a first clock cycle, and inputting a concatenated data word of the second input tensor into the compute channel in a second clock cycle.

7. The computer-implemented method of claim 5, wherein the first input tensor and the second input tensor are inputted from a same buffer memory.

8. The computer-implemented method of claim 5, wherein outputting the output data elements of the output tensor from the compute channel is performed at a throughput of one output data element per clock cycle.

9. The computer-implemented method of claim 5, wherein the compute channel includes a first compute stage that masks out a portion of a concatenated data word of the first input tensor to obtain a first data element of the first input tensor in the second datatype.

10. The computer-implemented method of claim 9, wherein the compute channel includes a second compute stage that shifts the concatenated data word of the first input tensor to obtain a second data element of the first input tensor in the second datatype.

11. The computer-implemented method of claim 10, wherein the compute channel includes a third compute stage that masks out a portion of a concatenated data word of the second input tensor to obtain a first data element of the second input tensor in the second datatype.

12. The computer-implemented method of claim 11, wherein the compute channel includes a fourth compute stage that shifts the concatenated data word of the second input tensor to obtain a second data element of the second input tensor in the second datatype.

13. The computer-implemented method of claim 12, wherein the compute channel includes a fifth compute stage that performs the binary operation on the first data element of the first input tensor with the first data element of the second input tensor to obtain a first output data element of the output tensor.

14. The computer-implemented method of claim 13, wherein the compute channel includes a sixth compute stage that performs the binary operation on the second data element of the first input tensor with the second data element of the second input tensor to obtain a second output data element of the output tensor.

15. The computer-implemented method of claim 5, wherein the output data elements are outputted from the compute channel in the second datatype.

16. The computer-implemented method of claim 5, wherein the compute channel includes an input datatype converter and an output datatype converter, and the method further includes converting each of the output data elements from the second datatype to the first datatype or to a third datatype using the output datatype converter.

17. The computer-implemented method of claim 16, wherein the input datatype converter is bypassed when the concatenated data words of the first input tensor and the concatenated data words of the second input tensor are provided to the compute stages of the compute channel.

18. The computer-implemented method of claim 5, wherein the first datatype is a 16-bit brain float (BF16) datatype, and the second datatype is a 32-bit floating-point (FP32) datatype.

19. A non-transitory computer readable medium storing code that, when executed by an integrated circuit device having a compute channel, causes the integrated circuit device to perform operations including:
inputting concatenated data words of a first input tensor and concatenated data words of a second input tensor into a compute channel having a plurality of compute stages coupled in series, wherein each concatenated data word includes multiple data elements;
converting, using a first subset of the compute stages, the concatenated data words of the first input tensor and the concatenated data words of the second input tensor represented in a first datatype into data elements represented in a second datatype;

performing, using a second subset of the compute stages, a binary operation on each data element represented in the second datatype from the first input tensor with a corresponding data element represented in the second datatype from the second input tensor to generate output data elements of an output tensor represented in the second datatype; and outputting the output data elements of the output tensor from the compute channel.

20. The non-transitory computer readable medium of claim 19, wherein the operations include toggling between inputting a concatenated data word of the first input tensor in a first clock cycle, and inputting a concatenated data word of the second input tensor into the compute channel in a second clock cycle.

21. The non-transitory computer readable medium of claim 19, wherein the operations include outputting the output data elements of the output tensor at a throughput of one output data element per clock cycle.

\* \* \* \* \*